Patented Apr. 22, 1947

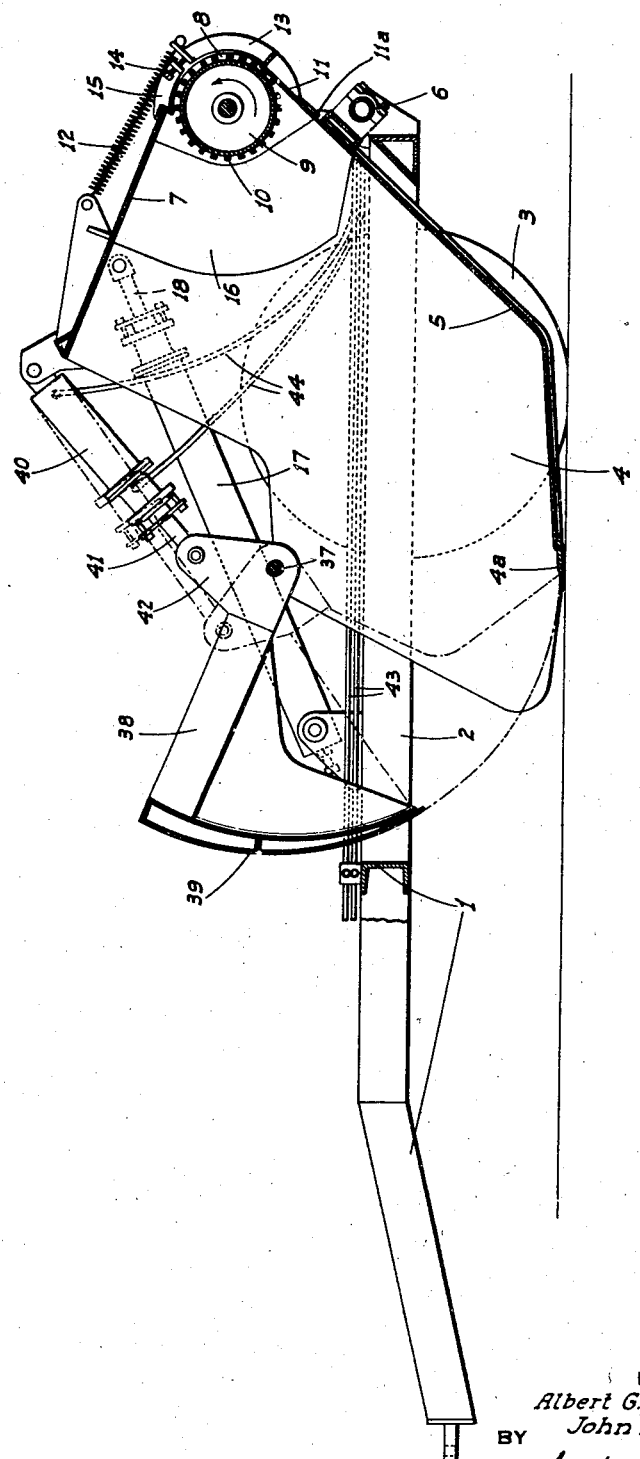

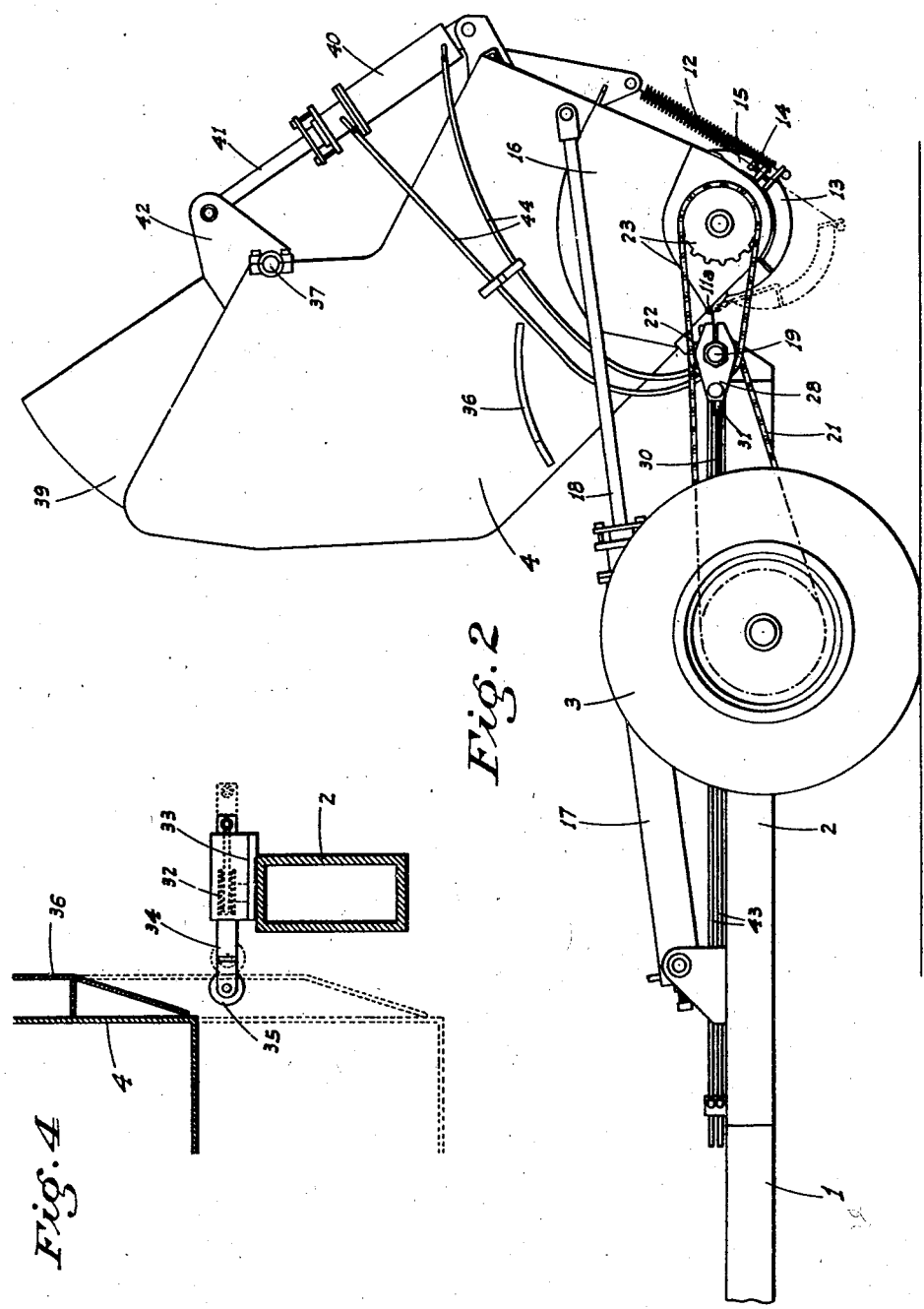

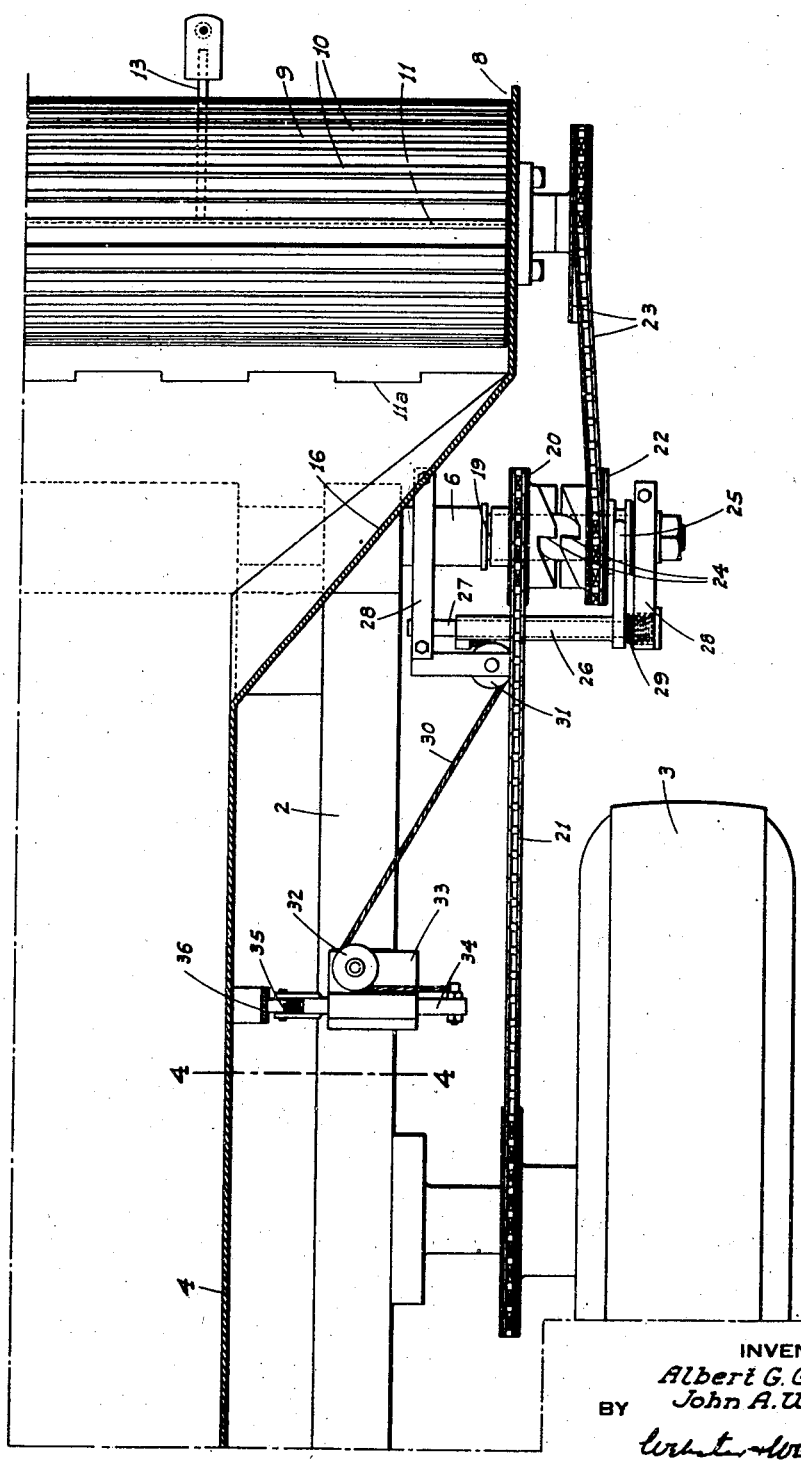

2,419,262

UNITED STATES PATENT OFFICE 2,419,262

SELF-LOADING MATERIAL SPREADER

Albert G. Gurries and John A. White, Jr., Gilroy, Calif.; said White assignor to said Gurries Application October 29, 1943, Serial No. 508,116

3 Claims. (Cl. 275—1)

This invention relates to load carrying and spreading implements, one object being to provide an implement of this general type so constructed that material may be gathered or scraped from the ground, transported any desired distance, and then spread in an even and relatively thin layer over a designated area. The machine is particularly designed for spreading gypsum and similar commercial fertilizers over a field, the gypsum being first dumped on the ground in heaps, as is common practice.

The spreader mechanism of the implement includes a rotary spreader roll which restrains the discharging flow of the material when the bowl is tilted to a discharge position, and a further object is to provide a drive means for the roll arranged so that it is brought into operation automatically only when the bowl is thus tilted, so that the spreader is idle when the bowl is loading or being transported, thus reducing wear on the bearings and operating mechanism, and there is no possibility of any of the material being discharged from the bowl until the latter is in the proper position.

The implement includes a scraper-like bowl and an apron engageable with the front end of the bowl, and another object is to so mount and control the apron that the latter may not only be moved to a closing position with the front end of the bowl irrespective of the position of said end relative to the ground, but in so doing will forcefully cut through the material in its path and thus gather up and confine a maximum amount of the same between the apron and the bowl.

These objects we accomplish by means of such structure and relative arrangement of parts as will fully appear by a perusal of the following specification and claims.

In the drawings similar characters of reference indicate corresponding parts in the several views:

Figure 1 is a sectional elevation of the implement in the loading position.

Figure 2 is a side elevation of the implement with the bowl in discharge or spreading position.

Figure 3 is a fragmentary enlarged top-plan view with the bowl in section and as in loading or carrying position, and showing the spreader control mechanism disengaged or inoperative.

Figure 4 is a fragmentary transverse section on the line 4—4 of Fig. 3.

Referring now more particularly to the characters of reference on the drawings, the implement comprises a frame 1 adapted for supported connection with a draft tractor and including spaced side beams 2 supported toward their rear end by wheels 3 outside the beams. A bowl 4 is disposed between the beams, and its form and mounting is substantially as shown in Patent No. 2,203,615 dated June 4, 1940, and includes a back wall 5 sloping upwardly from the bottom, and which wall is turnably mounted adjacent its rear upper end on a cross shaft 6 supported from the beams 2 at their rear end, as in said patent. In the present instance the bowl also includes a top wall 7 extending in diverging relation to the wall 5 and spaced therefrom to provide a discharge gap 8. This gap is closed by a rotary spreader roll or drum 9 which is provided with circumferentially spaced ribs 10 extending for its full length. The ribs move close to the wall 7, while the corresponding portion of the back wall 5 is in the form of a downwardly swinging hinged gate 11. This gate is substantially tangent to the roll and terminates at its rear end adjacent the point of tangency, the hinged line 11a of the gate being a short distance ahead of the roll. The gate is normally held close to the roll by springs 12 acting on arms 13 projecting rearwardly from the gate, while the spacing of the gate from the ribs may be adjusted by set screws 14 engaging the outer end of arms 13 and mounted in corresponding arms 15 fixed with and projecting from the wall 7. By reason of this arrangement the amount of material which may pass between the spreader roll and the gate may be adjusted, so as to alter the thickness of the layer of material being spread, while the yieldability of the gate away from the roll prevents possible damage in the event that any large, relatively unbreakable lumps, such as rocks etc., should be mixed with the material in the bowl.

In order that the spread of the material shall take place over a relatively wide swath, the roll is considerably wider than the bowl itself, the sides of the bowl flaring out to the ends of the roll, as shown at 16, from a point some distance ahead of the same, and the walls 5 and 7 of the bowl being correspondingly wider along the flared portions.

The bowl is swung upwardly and rearwardly from a material gathering position, as shown in Fig. 1, through a carrying position to a discharge position, as shown in Fig. 2, by hydraulic units which include cylinders 17 mounted on the beams 2 and piston rods 18 projecting rearwardly from the cylinders and connected to the sides of the bowl above the shaft 6. When the bowl is in a discharge position the wall 5 is disposed with a downward slope to the rear and the wall 7 is upstanding, as shown in Fig. 2. All the material in the bowl naturally then tends to move through the discharge gap 8 but is restrained from so doing by the spreader roll, the speed of which, together with the setting of the gate relative to the roll, determines the rate of discharge.

In order to cause the roll to rotate in a direction to discharge the material between the roll and the gate only when the bowl is tilted to a discharge position, the following mechanism is provided:

Turnably mounted on a lateral extension 19 of the cross shaft 6 is a sprocket wheel 20 connected by a chain drive 21 with the adjacent implement wheel 3. The sprocket wheel 20 is thus constantly turning as long as the implement is moving. Turnable and also slidable on the extension 19 laterally out from the sprocket wheel 20 is another sprocket wheel 22 connected by a chain drive 23 with the adjacent end of the spreader roll. The sprocket wheels are provided on adjacent sides with cooperating clutch jaws 24, while the sprocket wheel 22 is engaged by a shift fork 25. This fork is mounted on a sleeve 26 slidable on a rod 27 parallel to the shaft extension 19 ahead of the same, and mounted on and between a pair of brackets 28 clamped on said extension. A spring 29 on the rod between the outermost bracket and the fork acts to slide said fork and the sprocket wheel 22 in a direction to maintain the clutch jaws engaged, and such engagement is aided by the fact that the cooperating working faces of the jaws are cut on a slight backward slope, as shown in Fig. 3.

The sleeve 26 is normally pulled against the resistance of the spring 29 to a clutch disengaging position by a cable 30 connected at one end to the sleeve. The cable extends thence parallel to the sleeve for a short distance laterally out, then about a pulley 31 fixed with the inner bracket 28, and then forwardly to and about another pulley 32 fixed with another bracket 33 mounted on the adjacent beam 2 rearwardly of the center of the wheels 3. From this pulley 33 the cable extends laterally out to an anchor on the outer end of a stem 34 slidable in the bracket 33 in a direction transversely of the implement. The laterally inner end of the stem carries a roller 35 engageable with a cam plate 36 secured on the adjacent side of the bowl 4 and curved about the shaft 6 as a center. The cam plate is designed so that as long as the bowl is in a loading or carrying position, the stem 34 is held depressed and the cable is pulled to maintain the clutch out of engagement, as shown in Figs. 3 and 4. When the bowl is lifted to a discharge position, however, the cam plate leaves the stem roller, as shown in dotted lines in Fig. 4, releasing said stem and the cable and allowing the spring 29 to shift the sprocket wheel 22 so as to engage the clutch and cause the spreader roll to be driven. As soon as the bowl is lowered after a discharge operation is completed, the cam plate again engages the roller 35 and causes the clutch to become disengaged.

As stated in the preamble, the implement is particularly designed to gather material from the ground for subsequent spreading, and such material is usually of a somewhat light and powdery nature and tends to heap up ahead of the gathering edge or blade 4a of the bowl, as the latter becomes filled. To enable such heaped-up material to be effectively loaded into the bowl with the least possible amount being left on the ground, we provide the following device:

A cross shaft 37 is mounted on the bowl directly above the blade, or on a line substantially at right angles to the longitudinal plane of the blade. Forwardly projecting arms 38 are mounted on this shaft, which at their forward ends support a curved apron 39 whose outer face is concentric with the shaft. As the apron moves down therefore its rear lower end gradually assumes a substantially horizontal position so that it passes through the heap of material on the ground ahead of the blade quite close to the ground, and leaves but a shallow layer of material remaining on the ground under the apron. The apron being mounted on the tiltable bowl itself, it may cooperate in closing relation with the blade of the bowl irrespective of the level of said blade relative to the ground.

In order to forcefully move the apron to a fully closed position regardless of the resistance of the material through which the apron moves, hydraulic units are mounted on the adjacent sides of the bowl above the apron. Each unit includes a cylinder 40 pivoted at its rear end on the bowl adjacent the forward end of the top plate 7 and a piston rod 41 projecting from the forward end of the cylinder and connected to a short arm 42 rigid with and projecting upwardly from the adjacent apron arm 38. These units are mounted on the bowl and swing therewith, and therefore the fluid supply conduits 43 leading thereto from a source of pressure on the draft tractor ahead, include flexible portions 44 extending from the cylinders 40 to points on the frame adjacent the shaft 6 and thence ahead along the frame as indicated. This arrangement reduces to a minimum the amount of play of the conduits necessitated by the swinging movement of the bowl as it moves from one position to the other about the shaft 6 as an axis.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A material spreading implement comprising a frame movable along the ground, a material holding body pivotally mounted on the frame and tiltable upwardly from a carrying to a discharge position, means to tilt the body, the latter having a transverse discharge gap, a rotary spreader roll closing the gap, the frame having ground engaging wheels, a disengageable drive mechanism between one wheel and the roll and including a clutch and a spring tending to hold the clutch engaged, a pull cable applied to the clutch and functioning when pulled to disengage the clutch, a member mounted on the frame for lateral movement to which the cable is connected, means guiding the cable so that upon lateral outward movement of said member the cable will be pulled, and a cam plate on the adjacent side of the body engageable with the member to thus move the same laterally out upon downward tilting of the body from a discharge position.

2. A material spreading implement comprising a frame movable along the ground, a material holding body pivotally mounted on the frame and tiltable upwardly from a carrying to a discharge position, means to tilt the body, the latter having a transverse discharge gap, a rotary spreader roll closing the gap, the frame having ground engaging wheels, a shaft mounted in relation with the frame laterally out from the body and coaxial with the point of pivotal mounting of the latter, a member turnable on said shaft, a drive connection between said member and the adjacent wheel, another member turnable and slidable on the shaft, a drive connection between said last named member and the spreader roll, cooperating clutch elements on said members, yieldable means to hold the elements engaged, and means acting against said yieldable means to disengage the elements and functioning upon downward tilting of the body from a discharge position.

3. A self loading material gathering and spreading unit comprising a frame supported above the ground for movement therealong, a material gathering and holding body pivotally mounted on the frame, said body being in the form of an open front scraper bowl which in normal loading or carrying position comprises a substantially horizontally disposed bottom wall provided at its forward end with a cutting blade, side walls, a back wall and a top wall, said back and top walls sloping upwardly and rearwardly and downwardly and rearwardly, respectively, with their rear edges spaced apart to form a discharge gap at a point substantially above the ground level, said body being tiltable about its pivotal point whereby the body may be selectively lowered to the ground for digging and loading material into the body or raised to carrying position or up-ended to discharge the load through said gap, means carried by the frame for so tilting said body, and a driven transverse spreader roller disposed in the gap.

ALBERT G. GURRIES.
JOHN A. WHITE, Jr.

REFERENCES CITED

The following references are of record in the file of this patent:

UNITED STATES PATENTS

| Number | Name | Date |
| --- | --- | --- |
| Re. 12,997 | Waddell | July 27, 1909 |
| 1,040,888 | Courie | Oct. 8, 1912 |
| 1,606,949 | Litchfield | Nov. 16, 1926 |
| 1,689,342 | Hiller | Oct. 30, 1928 |
| 2,031,650 | Hendricks | Feb. 25, 1936 |
| 775,357 | Waddell | Nov. 22, 1904 |
| 1,101,358 | Thompson | June 23, 1914 |
| 2,203,615 | Gurries | June 4, 1940 |
| 2,304,786 | Armington et al. | Dec. 15, 1942 |

FOREIGN PATENTS

| Number | Country | Date |
| --- | --- | --- |
| 20,602 | Denmark | Sept. 15, 1915 |